United States Patent
Freysz et al.

(10) Patent No.: US 9,522,436 B2
(45) Date of Patent: Dec. 20, 2016

(54) SYSTEM FOR CONVERTING ELECTRIC ENERGY INTO THERMAL ENERGY

(71) Applicant: CENTRE NATIONAL DE LA RECHERCHE SCIENTIFIQUE, Paris (FR)

(72) Inventors: Eric Freysz, Pessac (FR); Jean-Paul Robert-Arnouil, Merignac (FR)

(73) Assignee: CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 165 days.

(21) Appl. No.: 14/350,312

(22) PCT Filed: Oct. 4, 2012

(86) PCT No.: PCT/EP2012/069647
§ 371 (c)(1),
(2) Date: Apr. 7, 2014

(87) PCT Pub. No.: WO2013/050492
PCT Pub. Date: Apr. 11, 2013

(65) Prior Publication Data
US 2015/0021301 A1   Jan. 22, 2015

(30) Foreign Application Priority Data
Oct. 5, 2011   (FR) ...................... 11 58968

(51) Int. Cl.
*B23K 9/067*   (2006.01)
*B23K 10/00*   (2006.01)
(Continued)

(52) U.S. Cl.
CPC ............ *B23K 9/0675* (2013.01); *B23K 10/00* (2013.01); *B23K 10/006* (2013.01); *B23K 10/02* (2013.01);
(Continued)

(58) Field of Classification Search
CPC ....... B23K 9/0675; B23K 10/00; B23K 10/02; B23K 10/006; H05H 1/34; H05H 2001/3426; H05H 1/26
(Continued)

(56) References Cited

U.S. PATENT DOCUMENTS

| | | | |
|---|---|---|---|
| 3,404,403 A | 10/1968 | Vallese, et al. | |
| 4,179,599 A | 12/1979 | Conrad | |

(Continued)

FOREIGN PATENT DOCUMENTS

WO   0064618 A2   11/2000

*Primary Examiner* — Mark Paschall
(74) *Attorney, Agent, or Firm* — Baker & Hostetler LLP

(57) ABSTRACT

A system for transferring electrical energy to thermal energy which comprises two electrodes separated by a distance along the axis joining them and able to create field lines defining a zone of influence when subjected to a potential difference, an electrical power supply device for these electrodes, which is able to provide the potential difference, and a device for triggering an electric arc between these two electrodes. The triggering device comprises a device for emitting a laser pulse, a device for focusing the pulse at N focusing points situated in the zone of influence of the two electrodes, with a peak power density of the pulse per focusing point of greater than 1 GW/cm$^2$, N being determined as a function of the peak power of the pulse and of the distance d which is fixed, so as to form an electrically conducting zone between the two electrodes.

8 Claims, 2 Drawing Sheets

(51) Int. Cl.
*H05H 1/34* (2006.01)
*B23K 10/02* (2006.01)

(52) U.S. Cl.
CPC ........ *H05H 1/34* (2013.01); *H05H 2001/3426* (2013.01)

(58) Field of Classification Search
USPC ............ 219/121.48, 121.52, 121.54, 121.57, 74,219/75, 121.76, 121.77
See application file for complete search history.

(56) References Cited

U.S. PATENT DOCUMENTS

| | | | | |
|---|---|---|---|---|
| 5,541,385 | A * | 7/1996 | Konkola | H05H 1/02 219/121.43 |
| 5,705,785 | A | 1/1998 | Dykhno et al. | |
| 5,821,493 | A * | 10/1998 | Beyer | B23K 28/02 219/121.45 |
| 6,373,023 | B1 * | 4/2002 | Hoskins | H05H 1/54 219/121.48 |
| 6,388,227 | B1 * | 5/2002 | Dykhno | B23K 26/1429 219/121.45 |
| 7,960,669 | B2 * | 6/2011 | Yamaguchi | B23K 10/006 219/121.39 |

\* cited by examiner

SYSTEM FOR CONVERTING ELECTRIC ENERGY INTO THERMAL ENERGY

CROSS-REFERENCE TO RELATED APPLICATIONS

This application is a National Stage of International patent application PCT/EP2012/069647, filed on Oct. 4, 2012, which claims priority to foreign French patent application No. FR 1158968, filed on Oct. 5, 2011, the disclosures of which are incorporated by reference in their entirety.

FIELD OF THE INVENTION

The field of the invention is that of the transfer of electrical energy to thermal energy such as used in plasma torches or welding stations, and which is initiated by means of an electric arc. The invention pertains more particularly to the device for triggering the electric arc.

BACKGROUND

Plasma torches of non-transferred arc type, an example of which is shown in FIG. 1, comprise two coaxial tubular electrodes 1, 2 separated by a plasma-generating gas 3 injection chamber 4, devised in such a way that this gas is injected vortex-fashion into the torch. The electrodes are dubbed upstream and downstream with respect to the direction of the gas flow. The downstream electrode 2 is supplemented with a starter point 21.

The manner of operation of the torch is briefly recalled hereinbelow:

- The application of a continuous electric current to the terminals of the electrodes makes it possible to initiate an electric arc 10 between the electrodes 1, 2. At present, the triggering of this electric arc inside high-power (that is to say greater than 80 kW) plasma torches, is carried out by "contact" short-circuiting the two electrodes: the upstream electrode 1, movable in translation along its axis, advances inside the plasma torch until it touches the downstream electrode 2. The two electrodes are thereafter fiercely parted until separated by an operating distance d, at the same time as a current is applied to the terminals of the two electrodes thus creating the electric arc 10.
- On contact of the arc, the gas 3 heats up rapidly and is transformed into a very high-temperature plasma.
- The injection of plasma-generating gas 3 into the torch coupled with the use of a field coil 5 thereafter makes it possible to stretch this arc so that it takes a position inside the electrodes of the torch.
- The ionized gas is expelled in tandem therewith through the downstream end of the torch. This results in a plasma jet or "dard" at very high temperature typically 4000 K.
- The magnetic field coil 5, wound around the upstream electrode, makes it possible to drive the movement of the arc foot 10 so as to control the region of wear and to increase the longevity of the electrode 1.
- A cooling system 6 ensuring circulation of a water film in contact with the exterior surface of the electrodes allows the cooling of the components exposed to the arc or to the plasma.
- The operating point of the torch is chosen by simultaneously fixing a specific electric current and by controlling the flowrate of plasma-generating gas introduced into the torch.

Although this ignition process is very efficacious, it nonetheless exhibits drawbacks.

In particular, the upstream electrode must be mounted on a hydraulic ram allowing its translation. This ram together with the associated hydraulic plant represents a sizable investment and requires regular maintenance operations.

Adjustment of the two time lags between the retreat of the electrode and the application of the electric current is very tricky.

Moreover the electrical power supplies must be capable of withstanding high no-load voltages as well as large variations in current, typically of the order of 100 A depending on the priming current between the voltage spike required during the "contact" short-circuit and the operating voltage. They must make it possible to support the current in the electrical circuit composed of the two electrodes during the transition between the contact short-circuit and the open circuit, the latter comprising the two electrodes and ionized plasma-generating gas.

Other techniques are also known for triggering an electrical discharge in a low-power plasma torch, such as the use of a conventional sparkplug or an RF discharge. But having regard to the small separation between the electrodes that is required for these techniques, they are not suited to energy transfer systems such as high-power plasma torches.

SUMMARY OF THE INVENTION

The aim of the invention is to alleviate these drawbacks.

The principle of the invention is to create a triggering laser plasma between the electrodes of the system, these electrodes being separated by a fixed distance which is their operating distance. The triggering laser plasma is produced using an intense laser pulse which is focused at various points between the two electrodes.

More precisely the subject of the invention is a system for transferring electrical energy to thermal energy which comprises:
- two electrodes separated by a distance d along the axis joining them and able to create field lines defining a zone of influence when subjected to a potential difference (pd),
- an electrical power supply device for these electrodes, which is able to provide the potential difference (pd),
- a device for triggering an electric arc between these two electrodes.

It is mainly characterized in that the triggering device comprises a device for emitting a laser pulse and a device for focusing the pulse at N focusing points situated in the zone of influence of the two electrodes, with a peak power density of the pulse per focusing point of greater than 1 GW/cm$^2$, so as to form an electrically conducting zone between the two electrodes, N being determined as a function of the peak power of the pulse and of the distance d which is fixed.

This makes it possible:
- to use electrodes separated by a fixed distance, and therefore
- to dispense with the device for translating these electrodes, such as the ram cited in the preamble,
- to simplify the energy transfer system's electrical power supply which is no longer invoked by the contact short-circuit and its constraints in terms of high no-load voltages and large variations in current,
- to dispense with the constraints of time lag between the retreat of the electrode and the application of the electric current.

According to a characteristic of the invention, the focusing device comprises a frequency multiplier able to produce at least one harmonic of the laser pulse, placed at the output of the pulse emission device, and a chromatic convergent optic placed downstream of the multiplier, focusing points then being determined as a function of these harmonics.

According to an alternative, the focusing device comprises an achromatic convergent optic able to focus the pulse at several focusing points.

One or both electrodes can be perforated, so as to allow the laser pulse to pass through.

Preferably, a part of an electrode is on the path of the laser pulse so as to interact with this pulse.

An electrode is optionally replaced or supplemented with a starter point.

This transfer system can be a welding station.

The subject of the invention is also a plasma torch comprising a transfer system such as described and a device for injecting a plasma-generating gas between the two electrodes.

BRIEF DESCRIPTION OF THE DRAWINGS

Other characteristics and advantages of the invention will become apparent on reading the detailed description which follows, given by way of nonlimiting example and with reference to the appended drawings in which.

Across the figures, the same elements are tagged by the same references.

DETAILED DESCRIPTION

Figure 1:
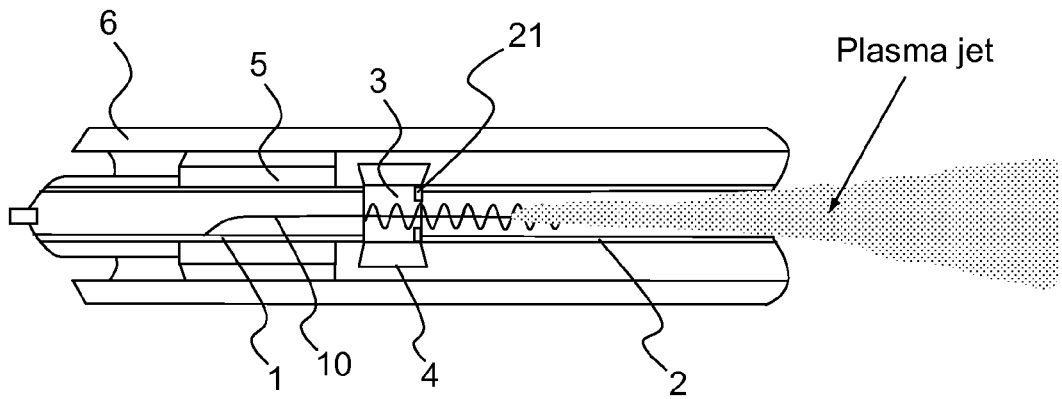
FIG. 1 schematically represents an exemplary plasma torch according to the prior art, FIG. 2 schematically represent various exemplary embodiments of a system for transferring electrical energy to thermal energy according to the invention, FIG. 3 show the evolution of the peak voltage U of the electric arc created between the two electrodes for various values of the separation d, of the voltage pd applied across the terminals of the electrodes (100 V for FIG. 3a, 700 V for FIG. 3b) and of the energy of the laser pulse.

As taught in electrostatics, if an electric field of greater than 3 kV.mm$^{-1}$ is applied in dry air, the latter no longer behaves as a dielectric medium and an electric arc is created. The microscopic mechanism responsible for this phenomenon is the acceleration by the electric field of the small number of free electrons in the air. They are accelerated, collide and ionize the neutral gases making up the air (essentially N2 and O2). The ionization of the neutral gases is manifested by the tearing away of one or more electrons. An electron avalanche effect is thus obtained, which is manifested by a very rapid increase in the number of electrons along the axis between the two electrodes. The air which was initially an insulating medium very rapidly becomes conducting. A sizable current, responsible for the electric arc, then flows between the two electrodes.

It has been shown that by focusing an energetic laser pulse, between two electrodes several centimeters apart and subjected to a pd, an electric arc is created.

The principle of electric arc ignition is to create a triggering laser plasma between the upstream and downstream electrodes. It is produced using a focused intense laser pulse which ionizes the various gases contained in the air. Electrons are produced by multi-photon ionization. As soon as their density is sufficiently sizable, these electrons, associated with the initially free electrons, strongly absorb the energy of the laser pulse (a phenomenon sometimes known by the term inverse "Bremsstrahlung"). In the presence of the electromagnetic field associated with the laser pulse, they are thus heated and collide with the various molecules of the air or of the gas. They ionize them by tearing one or more electrons from them. This constitutes an electron avalanche phenomenon which is manifested by a very strong increase in the electron and ion density which considerably reduces the resistivity of the air. In the illuminated zone, an extremely hot plasma is thus created. This hot plasma rapidly expands in the air or the gas and radiates in the visible and then disappears in a few microseconds. During the relatively brief lifetime of this plasma, of between 1 ns and 5 µs, the zone illuminated by the laser pulse is therefore strongly conducting and it can easily allow the triggering of an electric arc between two electrodes subjected to a large pd.

However as we have already pointed out, the plasma induced by a laser pulse is very well localized over time, but also in space. Thus, only the zone, along the axis of the laser beam, in which a laser plasma has been created, offers little resistance to the passage of a current. To produce a laser plasma, the energy per pulse must be greater than 1 GW/cm$^2$. For a pulse of 1 nanosecond having an energy of 10 milli Joules the extension of the plasma along the axis of propagation of the beam is typically about 1 mm.

The dimension of the laser plasma along the axis of the laser beam is therefore a priori limited to a few millimeters, and a little less in the perpendicular direction. It therefore restricts the distance between the electrodes of plasma torches to a few millimeters, for which distance the technologies cited in the preamble turn out to be just as simple to implement. This zone is typically less than 1 mm whereas the electrodes are a fixed distance apart of typically between 8 mm and 15 mm in their operating position.

The invention is based on a widening of the zone in which the laser plasma is induced. This is obtained by focusing the laser pulse at various points situated substantially along the axis between the two electrodes (more precisely, in the zone of influence of the field lines created by the two electrodes, the influence being strongest along the axis joining the electrodes). In the vicinity of the various focusing points, the zones in which a laser plasma has been created are strongly conducting. By thus multiplying the number of laser plasmas and by aligning them along the axis joining the two electrodes, the conducting zone is increased.

When at each of the focusing points, the peak power of the pulse is greater than the indicated peak power threshold, a laser plasma is produced. In practice a focusing point is in fact a spot whose non-zero dimension is proportional to the focal length and to the size of the laser beam on the lens; a focusing of short focal length and a laser beam covering the entrance pupil of the lens are therefore advantageously chosen, so as to decrease the size of the laser spot and thus concentrate the energy of the pulse on this spot. Preferably, the plasma is sustained by a succession of pulses, the rate of emission of the pulses depending on their duration. A rate of 10 Hz suffices for pulses of about 5 ns; a higher rate can occur but is not necessary.

To easily trigger the electric arc, the various laser plasmas must be close enough to engender a continuous electrically conducting zone between the two electrodes, even if it is not necessarily homogeneous, being strongly conducting in some places and weakly conducting in other places. They must not therefore be separated by more than a distance $d_1 < d$ which depends on the one hand on the pd applied across the terminals of the electrodes and on the other hand on the gas between these electrodes. For example, for dry air and a pd of about 10 kilovolts, the distance $d_1$ separating the various laser plasmas must not be greater than 10 millimeters. The latter distance can also be modulated by changing the size of the laser spot by varying the focal length of the lens, as indicated previously.

Of course the bigger it is possible for the distance $d_1$ between the various plasmas to be, the more it is possible for the inter-electrode distance d to be increased. This inter-electrode distance can be further increased by ablating a part of one of the electrodes with the laser pulse through the LIBS effect, the acronym standing for the expression "Laser Induced Breakdown Spectroscopy". In the latter case, the laser pulse vaporizes and/or ionizes a part of the upstream or downstream electrode. The zone thus created likewise offers little resistance to the passage of an electric current.

The invention thus makes it possible:
- to use electrodes separated by a fixed distance d,
- to dispense with the device for translating these electrodes,
- to simplify the energy transfer system's electrical power supply which is no longer invoked for a contact short-circuit and its constraints in terms of high no-load voltages and large variations in current,
- to dispense with the constraints of time lag between the retreat of the electrode and the application of the electric current; indeed, when switching the system on, the operating voltage is applied across the electrodes, and then the laser illumination is shined, thereby making it possible to trigger the electric arc between the electrodes, it being maintained by the same operating voltage.

Exemplary embodiments of a system for transferring electrical energy to thermal energy according to the invention are described in conjunction with FIG. 2. It comprises:
- two electrodes 1, 2, made of copper for example, separated by a fixed distance d, their operating distance,
- an electrical power supply device 20 for these electrodes which is able to apply a pd (of a few kV generally) between these electrodes, and which may be for example a capacitor whose terminals are these electrodes or a coil or a rectifier,
- a device 30 for emitting a laser pulse of peak power greater than 1 $GW/cm^2$, toward the zone of influence situated between the two electrodes; this entails for example an Nd:YAG laser delivering pulses having an energy of 330 mJ, centered at a wavelength of 1.064 µm and having a duration of 10 ns or else pulses of 33 mJ having a duration of 1 ns,
- a device 40 for focusing the pulse between the two electrodes according to N focusing points. These focusing points must be situated in the zone of influence of the field lines created by the two electrodes. This focusing of the laser pulse simultaneously at several points can be obtained in various ways. By focusing a pulse of an Nd:YAG pulsed laser which is doubled and tripled (even more) in frequency with a chromatic optic 41 of short focal length, generally comprising a group of lenses 412 as may be seen in the figures. In this case, the focusing device furthermore comprises a frequency multiplier 42 placed at the output of the laser pulse emission device 30 and upstream of the chromatic optic 41, and able to produce harmonics of the laser pulse. In the case of the laser cited as an example and tripled in frequency, a pulse with wavelengths centered at 1064 nm, 532 nm and 335 nm and which is focused at three points along the pulse propagation axis 31 is obtained by using a chromatic focusing optic. According to an alternative, the focusing optic is optionally achromatic but has a configuration such that for example the center of the beam is focused at one point, and its periphery at another point, these two focusing points being along the pulse propagation axis 31. An optic combining the two possibilities can also be envisaged.

Figure 2A:
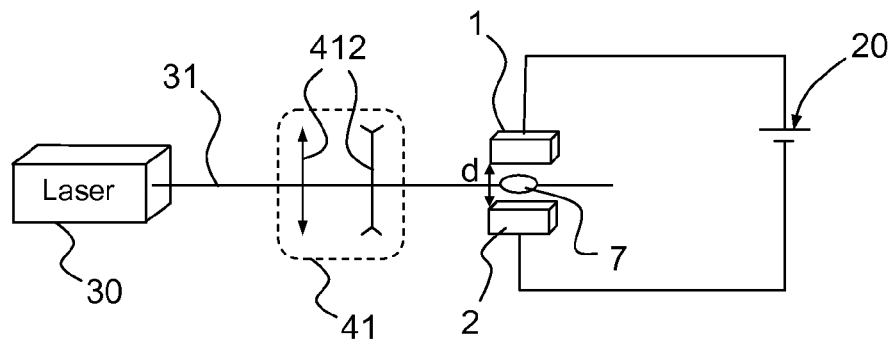

According to a first embodiment of the invention, the two electrodes 1, 2 are plates placed parallel to the laser beam axis 31, on either side of the beam as shown in FIG. 2a.

Figure 2B:
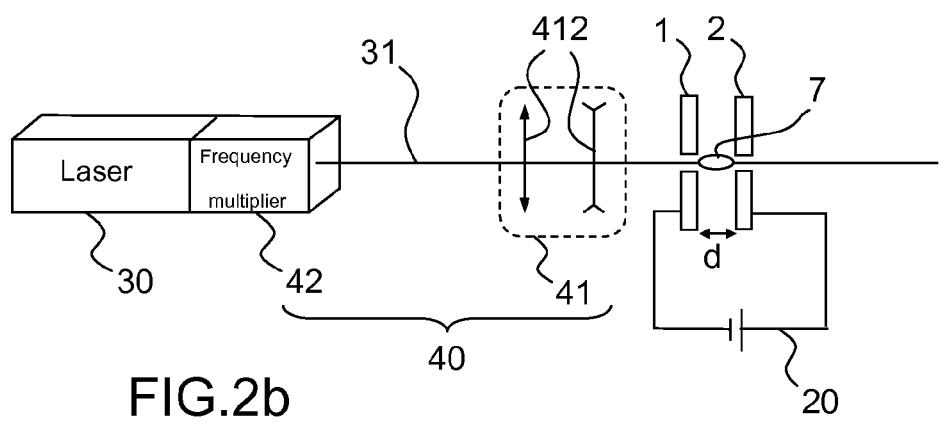

Having pointed out that the plasma 7 extends preferably along the laser beam propagation axis 31 as illustrated in FIGS. 2a and 2b, a second embodiment has been devised, shown in FIG. 2b: the two electrodes 1, 2 are plates placed perpendicularly to the laser beam propagation axis 31, the electrodes being perforated with a hole about 1 mm in diameter to allow the laser pulse to pass through. Preferably, only the electrode 1 situated on the side of the laser emission device is perforated since the impact of the laser pulse on the other electrode 2 ablates a part of the metal of the latter and thus facilitates the creation of the laser plasma 7, thereby making it possible to increase the inter-electrode distance d. Through the LIBS effect, the acronym standing for the expression Laser Induced Breakdown Spectroscopy, the pulse ionizes various species of the copper at the level of this electrode. This LIBS plasma which is added to the conventional laser plasma facilitates the decrease in the power threshold of the triggering laser.

Figure 2C:
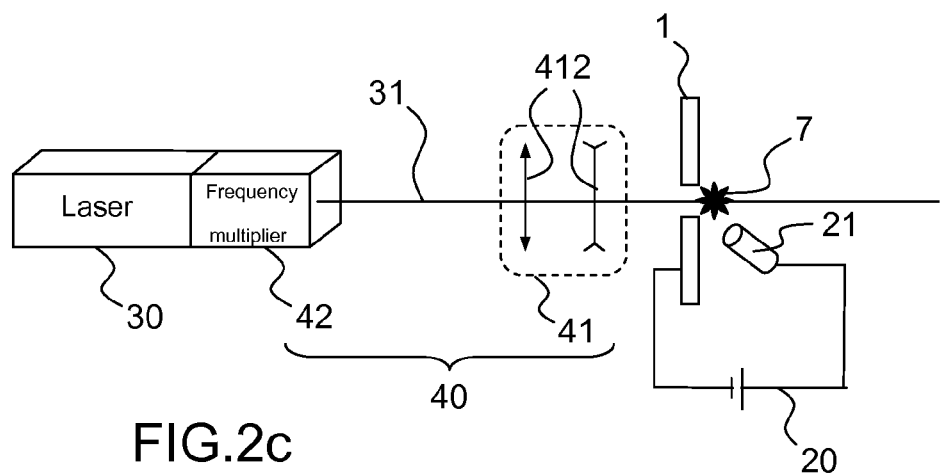

According to a third embodiment that may be seen in FIG. 2c, an electrode 2 is replaced or supplemented with a starter pin 21 such as used in the example of FIG. 1, preferably placed in such a way as to block the laser pulse.

Figure 3A:
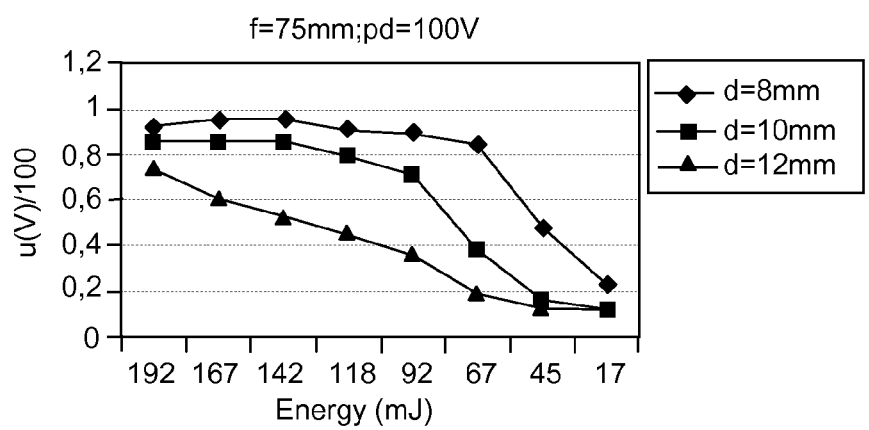
Figure 3B:
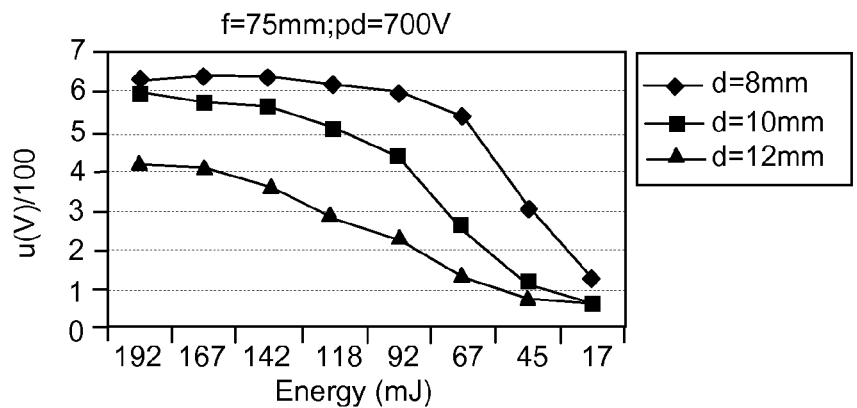

The evolution of the peak voltage U of the electric arc created between the two electrodes 1, 2 is shown in FIGS. 3a and 3b for various values of the separation d (8, 10 or 12 mm), of the voltage pd applied across the terminals of the electrodes (100 V for FIG. 3a, 700 V for FIG. 3b) and of the energy of the laser pulse. These values have been obtained with a system such as shown in FIG. 2c, equipped with a focusing device furnished with a frequency doubler producing on the basis of an Nd: YAG laser a pulse centered on 1064 nm and 532 nm, and with a chromatic optic having a focal length of about 7 cm, focusing the laser pulse at two points.

Figure 2D:
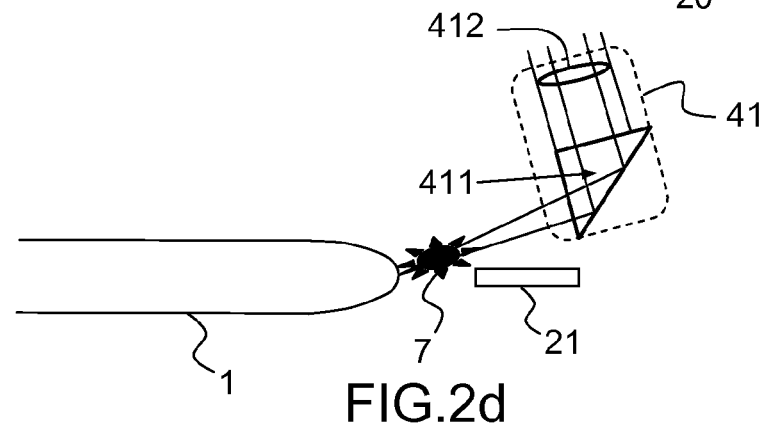

According to a fourth embodiment described in conjunction with FIG. 2d, the pulse emission device 30 may not be placed on the axis joining the two electrodes, because for example of unduly cramped mechanical conditions in the vicinity of the electrodes. In addition to a group of lenses 412, the optic of the focusing device placed off the axis joining the electrodes then comprises elements for returning the beam between the electrodes such as a mirror or a prism 411. The prism is for example made of sapphire, a material having excellent optical qualities and capable of withstanding without damage pulses of large energy and high temperatures.

This transfer system is for example applied to an electric welding station. At present, an electric arc is created between the two electrodes of the welding station by a contact short-circuit and the operator manually adjusts the inter-electrode distance so as to stretch the arc. A welding station according to the invention, equipped with its laser-based triggering device makes it possible to avoid this manual adjusting of the inter-electrode distance.

It can also be applied to a plasma torch. It is in this case supplemented with a device for injecting a plasma-generating gas between the two electrodes. Having regard to the configuration of the plasma torch and the cramped mechanical conditions in the vicinity of the electrodes, the pulse emission device may not be placed on the axis joining the two electrodes. The fourth embodiment is then favored. The triggering plasma makes it possible to initiate an electric arc between the two electrodes subjected to a potential difference (pd) of the order of a few kV. This laser-based triggering device replaces the ram system used at present. As in the case of conventional plasma torches, this electric arc is thereafter transferred into the upstream and downstream electrodes by injecting the plasma-generating gas.

The invention claimed is:

1. A system for converting electrical energy to thermal energy, comprising:
    two electrodes separated by a distance d along an axis joining the two electrodes, said two electrodes configured to create field lines defining a zone of influence when the two electrodes are subjected to a potential difference (pd),
    an electrical power supply device for said two electrodes configured to provide the potential difference (pd), and
    a triggering device configured to trigger an electric arc between the two electrodes, the triggering device including:
        a device for emitting a laser pulse,
        a device for focusing the laser pulse at N focusing points situated in the zone of influence of the two electrodes, with a peak power density of the laser pulse per focusing point being greater than 1 $GW/cm^2$, N being determined as a function of a peak power of the laser pulse and of the distance d, said distance d being fixed to form an electrically conducting zone between the two electrodes.

2. The system for converting electrical energy to thermal energy as claimed in claim 1, the device for focusing comprising a frequency multiplier configured to produce at least one harmonic of the laser pulse placed at an output of the device for emitting the laser pulse, and
    a chromatic convergent optic is placed downstream of the frequency multiplier, the N focusing points being determined as a function of the at least one harmonic.

3. The system for converting electrical energy to thermal energy as claimed in claim 1, the device for focusing comprising an achromatic convergent optic to focus the laser pulse at a plurality of focusing points.

4. The system for converting electrical energy to thermal energy as claimed in claim 1, wherein one or both of the two electrodes being perforated, so as to allow the laser pulse to pass through said one or both of the two electrodes.

5. The system for converting electrical energy to thermal energy as claimed in claim 1, wherein a part of an electrode in the two electrodes is on a path of the laser pulse to interact with the laser pulse.

6. The system for converting electrical energy to thermal energy as claimed in claim 1, wherein an electrode in the two electrodes is replaced or supplemented with a starter pin placed to block the laser pulse.

7. A plasma torch comprising the system for converting electrical energy to thermal energy as claimed in claim 1, and a device for injecting a plasma-generating gas between the two electrodes.

8. A welding station comprising the system for converting electrical energy to thermal energy as claimed in claim 1.

* * * * *